May 12, 1964     K. J. PSCHERA     3,132,870
GASKETS AND METHOD OF MAKING SAME
Filed Dec. 14, 1962

Karl J. Pschera,
*INVENTOR.*

BY

United States Patent Office 3,132,870
Patented May 12, 1964

3,132,870
GASKETS AND METHOD OF MAKING SAME
Karl J. Pschera, Huntsville, Ala., assignor to the United States of America as represented by the Secretary of the Army
Filed Dec. 14, 1962, Ser. No. 244,844
10 Claims. (Cl. 277—204)
(Granted under Title 35, U.S. Code (1952), sec. 266)

The invention described herein may be manufactured and used by or for the Government for governmental purposes without the payment of any royalty thereon.

This invention relates to soft metal coated spiral wound metallic gaskets and a method for manufacturing such gaskets. More particularly the invention concerns compressible spiral-wound gaskets with a layer of soft metal affixed to the side surfaces and a method for their manufacture.

The problem of hot gas leakage at the flanges of pipes, tubing, or containers, has existed for some time. Hot gases generally are above atmospheric pressure and this factor further complicates the problem of leakage. A particularly troublesome area in which hot gas leakage has become a serious problem is rocket engines, especially at the turbine manifold-to-exhaust-duct flange.

One answer to the problem has been the use of spiral-wound metallic gaskets. Examples of such gaskets are found in U.S. Patents 1,829,709 and 2,457,694. Essentially, these gaskets comprise metal strips spirally wound with non-metallic, compressible packing interposed between the several convolutions of the metal spiral. When such gaskets are employed to seal flanges and prevent the leakage of hot fluids, the compressible material should be heat resistant such as asbestos, spun glass, or other ceramic material.

The most saisfactory of the spiral wound metallic gaskets are those in which the metallic spiral winding is stainless steel and the compressible filler is asbestos. However, even this gasket fails to accomplish absolute sealing off of hot gases with any degree of dependability, especially at the turbine manifold-to-exhaust-duct flange of rocket engines. At elevated temperatures the stainless steel metal loses its spring qualities and the sealing capacity is thus impaired. Moreover, the mechanical bite between the stainless steel spiral and the stainless steel flange is reduced with rising temperatures.

The present invention comprises a modified spiral-wound metallic gasket which eliminates the leakage of hot gases at flanges. The modification consists of a layer of soft metal affixed to the side surfaces of the gasket. The soft metal improves the mechanical bite and the knife edge pressure seal between the gasket spiral and the flange surface.

In accordance with the foregoing, it is an object of this invention to provide a gasket suitable for sealing flanges used to conduct gases, particularly gases whose temperatures are in the range of 25° to 900° C.

Another object of the invention is to provide a gasket suitable for sealing flanges to prevent the leakage of hot gases at high pressures.

A still further object of the present invention is to provide a gasket especially suitable for sealing the turbine manifold-to-exhaust-duct flange of rocket engines.

Another and still further object of the invention is to provide a method for affixing soft metals to the side surfaces of spiral-wound metallic gaskets.

An additional object of the instant invention is to provide a method for depositing a thin base layer of soft metal on the side surfaces of spiral wound metallic gaskets in order that additional soft metal may be electrodeposited on the base layer by conventional techniques.

Additional objects of the invention will become apparent from the detailed description given below wherein.

Figure 1:
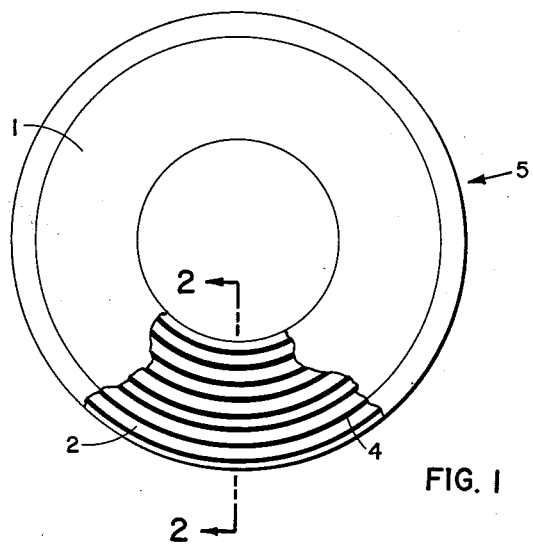
FIGURE 1 is a plan view partly broken away of a circular spiral-wound metallic gasket embodying the soft metal layer on the side surfaces according to the present invention.
Figure 2:
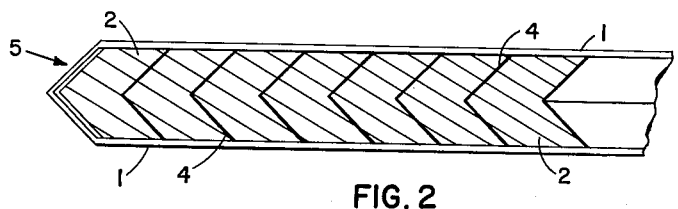
FIGURE 2 is a sectional view through the gasket taken on the line 2—2 of FIGURE 1.

Referring more in detail to the several illustrations, FIGURE 1 and FIGURE 2 disclose the invention embodied in a gasket 5 comprising a metal strip 4 wound in a spiral with a strip of compressible material 2 interposed between the successive layers of metal strip 4. Affixed evenly to the side surfaces of gasket 5 is a thin layer of soft metal 1. In this particular embodiment, the metal strip is V-shaped and this is the preferred configuration. However, the metal strip may be U-shaped or simply a flat metal strip of uniform width.

Figure 3:
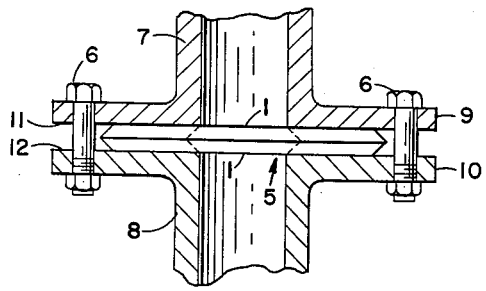
FIGURE 3 is a sectional view through two sections of pipe showing the gasket of the present invention compressed between the pipe flanges.

Referring to FIGURE 3, gasket 5 is shown as disposed between pipe flanges 9 and 10 of pipes 7 and 8. Flanges 9 and 10 are shown as secured by flange bolts 6 which are arranged in a circular pattern exterior to the gasket. Flange faces 11 and 12 are in contact with the thin layer of soft metal 1 on the side surfaces of the gasket 5. When the flange bolts are tightened, the flange faces are pressed against the soft metal layers of the gasket compressing the compressible material interposed between the metal strips and the metal strips themselves. The soft metal layer yields to the applied pressure thus filling all the voids between the flange faces and the gasket materials and thereby assures absolute sealing of the flanges.

The manufacture of soft metal coated spiral-wound metallic gaskets involves the problem of providing a means of depositing the soft metal on the non-conducting compressible material as well as the metal strips. Conventional electroplating techniques are not satisfactory since the non-conducting material would not be plated.

This problem is overcome by applying a soft metal-resinate solution to the side surfaces of the gasket. Application of the soft metal resinate can be accomplished through spraying, dipping, or painting, though spraying is preferred. Of course, the side surfaces of the gasket must be completely covered. There is usually no detriment to coating the inner and outer peripheral surfaces of the gasket with the resinate although, if desired, these edges may be protected from the resinate application by masking or any other suitable means of covering. Preferably, the inner peripheral surface of the gasket is protected to prevent depositing the metal-resinate on the inner edge. After the resinate is applied, and dries, the gasket is heated in the presence of oxygen (air, for example) to decompose the resinate and volatilize all organic matter thus leaving a thin layer of metal deposited on the entire side surfaces of the gasket. Additional heating for a short period of time stabilizes the metal deposit.

Depending on the metal content of the resinate solution, the soft metal layers will vary in thickness. Generally, the metal-resinate will contain from 8% to 25% metal. With resinates containing 24% metal, a thin layer of metal on the order of 0.001 inch is deposited upon decomposition of one application of the resinate. The metal-resinate applications are repeated until a layer of metal of sufficient thickness to furnish a base for electroplating is achieved, usually a thickness of 0.0003 in. to 0.0004 inch.

The temperature at which the resinate is decomposed depends upon the particular resinate solution. Manufacturers distribute this information with their products. A 24% silver-resinate solution decomposes readily at 400° C. and after all volatile material evolves, it is easily stabilized by heating at this temperature for an additional three to four minutes.

Another factor which affects the thickness of the metal layers deposited by the resinate applications is the dilution of the resinate solution. To achieve suitable consistency for spraying or painting the addition of an inert volatile solvent such as carbon tetrachloride or amyl acetate may be required.

After a sufficient thickness of base metal as achieved, additional soft metal is deposited on the gasket by conventional electrodepositing techniques until the soft metal layers on the side surfaces of the gasket each has a total thickness of substantially 0.003 inch. This thickness is by no means critical since sealing is accomplished when the amount of soft metal is less than or more than this amount. However, experience shows that the range of 0.003 inch to 0.004 inch is completely effective in stopping hot-gas leakage.

The gasket can be coated with any desired soft metal such as copper, silver, gold, and platinum according to the process of the invention. Moreover, the base metal deposited by the metal-resinate applications can differ from the metal which is electrodeposited on the base metal. For example, silver can be electrodeposited on a silver base layer or a gold base layer.

In selecting soft metals, their metallurgical properties should be evaluated in the light of the particular sealing problem at hand. Copper tends to oxidize at high temperatures and its hardness increases as a result of hydrogen content of electrocoatings of the metal. In addition to its costs, gold is not quite as desirable as silver since its ability to flow and recover is somewhat less than that of silver. The physical properties of these soft metals are well known and the choice of the proper metal for the particular job is well within the skill of the art.

The preferred embodiment of the invention is that wherein silver is the soft metal deposited on the side surfaces of the gasket. Silver exhibits very good plasticity thus providing the necessary "bite" for the metal spiral. The recovery rate of silver at room temperature is good and at elevated temperature, silver does not oxidize. The flow of the metal is sufficient to fill small cavities and pores created by temperature stresses while the excellent heat conductivity contributes to temperature equalization in the gasket. Silver is compatible with asbestos and yet wets the asbestos sufficiently to provide good adherence. The wetting properties of silver on stainless steel are sufficient but silver does not form alloys at the stainless steel-silver interface. Thus, the gasket does not contaminate the flange face and it may be removed and replaced due to this fact.

Actual tests of soft metal coated spiral wound metallic gaskets according to the present invention prevented gas leakage at flange joints when the temperature of the gases varied from 25° C. to 900° C. The real achievement in the gaskets is, however, their ability to provide absolute sealing of flanges wherein gases at 400° C. to 500° C. are being transported such as the manifold-to-exhaust-duct-flange of rocket engines.

While specific embodiments of the invention are disclosed hereinabove, these embodiments are for exemplification only, the scope of the present invention being limited only by the appended claims.

I claim:
1. A compressible gasket comprising:
   (a) A thin metal strip of uniform width wound into a spiral;
   (b) a layer of heat resistant compressible material interposed between the several convolutions of said spiral;
   (c) Each of the side surfaces of said spiral and said heat resistant compressible material lying in a common plane; and
   (d) A thin layer of soft metal affixed to each of said side surfaces.
2. A compressible gasket according to claim 1 wherein said metal strip is stainless steel.
3. A compressible gasket according to claim 2 wherein said layer of heat resistant compressible material is asbestos.
4. A compressible gasket according to claim 3 wherein said thin layer of soft metal is from about .001 inch to about .004 inch in thickness.
5. A compressible gasket according to claim 4 wherein said thin layer of soft metal is silver.
6. A compressible gasket according to claim 4 wherein said thin layer of soft metal is gold.
7. A compressible gasket according to claim 4 wherein said thin layer of soft metal is platinum.
8. A compressible gasket according to claim 4 wherein said thin layer of soft metal is copper.
9. A compressible gasket according to claim 4 wherein said thin layer of soft metal is silver electrodeposited on gold.
10. A compressible gasket comprising:
    (a) A stainless steel strip of uniform width wound into a spiral;
    (b) A layer of asbestos interposed between the several convolutions of said spiral;
    (c) Each of the side surfaces of said spiral and said heat resistant material lying in a common plane; and
    (d) A layer of silver substantially .003 inch in thickness affixed to each of said side surfaces.

References Cited in the file of this patent

UNITED STATES PATENTS

| | | |
|---|---|---|
| 2,244,640 | Davis | June 3, 1941 |
| 2,259,609 | Boyd | Oct. 21, 1941 |
| 2,580,546 | Hobson | Jan. 1, 1952 |
| 3,072,543 | Lubon et al. | Jan. 8, 1963 |
| 3,099,608 | Raduvsky et al. | July 30, 1963 |